United States Patent [19]
Sayles

[11] 3,848,352
[45] Nov. 19, 1974

[54] COVER FOR A HUNTER'S BLIND

[76] Inventor: Chester M. Sayles, 967 Montgomery Ave., San Bruno, Calif. 94066

[22] Filed: Nov. 7, 1973

[21] Appl. No.: 413,570

[52] U.S. Cl. .................................. 43/1, 220/35
[51] Int. Cl. .................................. A01m, 31/00
[58] Field of Search ...................... 43/1; 220/35

[56] References Cited
UNITED STATES PATENTS

| | | | |
|---|---|---|---|
| 736,714 | 8/1903 | Gendron | 220/35 UX |
| 1,277,918 | 9/1918 | Harris | 220/35 |
| 2,826,327 | 3/1958 | Gerhardt | 220/35 |
| 2,992,503 | 7/1961 | Webb | 43/1 |

Primary Examiner—Louis G. Mancene
Assistant Examiner—Daniel J. Leach
Attorney, Agent, or Firm—Owen, Wickersham & Erickson

[57] ABSTRACT

A cover for a hunter's blind of the kind used to camouflage the presence of a hunter screens a top opening in the blind. The cover is connected to the blind by a hinge at one edge of the cover. The pivot axis of the hinge extends horizontally so that the screen swings vertically about the hinge between a generally horizontally extending closed cover position on the blind and a generally vertically extending open position. This hinge construction permits quick movement of the cover from a closed position to an open position. It also serves a very important safety function in preventing a hunter from swinging his gun to an angle at which he might shoot a hunter in an adjacent blind.

13 Claims, 6 Drawing Figures

PATENTED NOV 19 1974 3,848,352

COVER FOR A HUNTER'S BLIND

BACKGROUND OF THE INVENTION

This invention relates to a hunter's blind of the kind used to camouflage the presence of a hunter. It relates particularly to a cover for blinds used for shooting wild fowl such as ducks.

Two general kinds of blinds are widely used for duck hunting.

In states where tank blinds are lawful an open top tank is often used. The tank is large enough for a hunter to sit inside and is usually substantially immersed in a marsh or other area in which the ducks are to be hunted. When the ducks fly in, the hunter stands up so that the upper part of his body is above the top in the tank, and he can then shoot the ducks from this position.

Because the ducks often will not alight in areas where they can see the open tops of such tanks, hunters often provide some sort of cover or screen to hide or mask the open top of the tank. Such covers have been made by attaching netting to an outer frame and then laying the frame on top of the tank. The frame has also been connected to the tank by a vertically extending pivot rod so that the hunter within the tank can swing the cover in a horizontal plane about the vertically extending pivot axis from a closed cover position to an open position.

A typical vertical pivot construction of this kind is shown in U.S. Pat. No. 2,992,503 to Webb, issued July 18, 1961, and entitled "Game Blind." This U.S. Pat. No. 2,992,503 shows a vertical pivot rod 18 which permits a cover 21 to be swung horizontally from a closed position shown in FIG. 1 to an open position shown in FIG. 2 of the patent.

The second commonly used type of duck blind is often built above ground and is composed primarily of tule reeds. This kind of blind is often used in states in which tank blinds are illegal. This second kind of blind is generally similar to the tank blind in that the hunter sits inside until the ducks come in for landing. At that time the hunter removes a cover on an open top of the blind and stands up to shoot the ducks.

One of the problems of the prior art blind cover arrangements was the general inconvenience in use. The cover needs to be connected to the blind so that it does not blow or float away after it is opened. The cover also needs to be connected in such a way that it can be moved quickly to the open position and retained securely in the open position without obstructing the opening at the top of the blind.

Another significant problem with the prior art duck blinds is the problem of safety. The duck blinds are often positioned relatively close together, and as one hunter swings his gun (following the descending flight of the ducks) it is relatively easy and not uncommon to swing the gun to an angle where the hunter can hit another hunter in an adjacent blind. Accidental gunshot injuries and even fatalities have occurred in such circumstances.

SUMMARY OF THE INVENTION

It is a primary object of the present invention to overcome the problems of the prior art cover arrangements for hunters' blinds.

It is a very important object of the present invention to construct a blind cover that positively prevents a hunter from swinging his gun to an angle at which he might injure a hunter in an adjacent blind.

The cover of the present invention comprises an outer frame or hoop with internal cross members. Netting is placed over the top of the frame, and the frame is connected at one edge to a sidewall of the blind.

The connection to the blind or to a vertical support on the blind comprises a hinge mechanism which has a generally horizontally extending axis so that the screen swings vertically about the hinge means between a generally horizontally extending closed cover position on the blind and a generally vertically extending opened position.

The hinge structure includes a first stop for holding the screen at the closed cover position and a second stop for holding the cover at the open position so that the cover can be quickly moved to either the closed position or the open position and retained securely at either of those positions by the stops.

In a specific form of the present invention strips of rubber are connected between a part of the hinged structure and the base or anchor for the cover in a way such that just a slight upward tap is sufficient to start the cover moving upward to the open position. The rubber strips thereafter continue to pull the cover toward the open position until the cover is engaged with the stop at the open position.

Because the cover swings to an upright vertical position in the open position, the relatively large diameter or width cover acts as a physical barrier to prevent the hunter from swinging his gun past the arc limited by the edges of the cover. This is a very important safety feature, particularly when a second blind is positioned adjacent to the first blind and the covers on the two blinds are each connected so that each cover opens toward the adjacent blind. With this construction neither hunter can accidentally swing his gun around to an angle at which he could injure the other hunter.

A blind cover apparatus and methods which incorporate the structure and techniques described above and which are effective to function as described above constitute specific objects of this invention.

Other objects, advantages and features of my invention will become apparent from the following detailed description of one preferred embodiment taken with the accompanying drawings.

BRIEF DESCRIPTION OF THE DRAWINGS

FIG. 2 also illustrates how the opened cover serves a safety function for preventing a hunter in one blind from accidentally swinging his gun around to an angle where he could hit a hunter in an adjacent blind;

DESCRIPTION OF THE PREFERRED EMBODIMENTS

Figure 1:
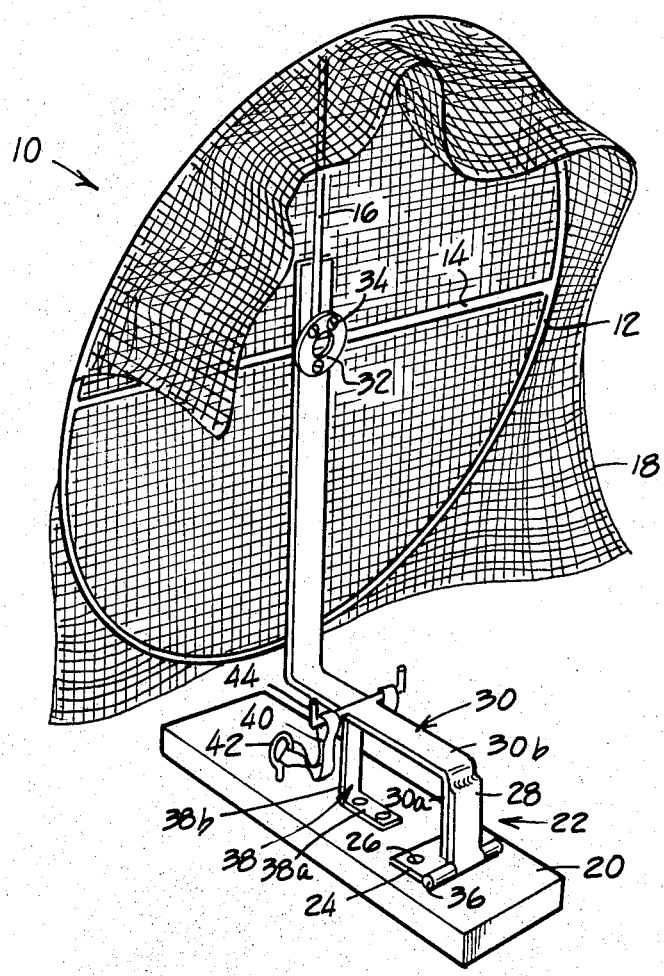
FIG. 1 is an isometric view of a cover for a hunter's blind constructed in accordance with one embodiment of the present invention.

A cover for a hunter's blind constructed in accordance with one embodiment of the present invention is indicated generally by the reference numeral 10 in FIG. 1.

The cover 10 comprises an outer frame or hoop 12 and cross-members 14 and 16.

Netting 18 is draped over the top of the frame 12 and is tied or otherwise suitably connected to the frame. The netting is open enough to permit the hunter to see through the netting when the cover is closed but is effective to screen the blind and the hunter from the view of the ducks or other wild fowl, particularly at the low angle of flight at which the ducks descend to the marsh for feeding.

The hoop 12 is mounted on a board or other support member 20 by a hinge 22. One hinge element 24 is connected to the support 20 by screws 26, and the other hinge element 28 is welded or otherwise suitably connected to a connecting piece 30 which is connected to the frame 12 and the cross-members 14 and 16 as by the clamping ring 32 and screws 34 shown in FIG. 1.

The hinge 22 thus mounts the cover for swinging movement about a horizontal axis of a pivot pin 36 of the hinge, and this is a very important feature of the present invention (as will become more apparent from the description to follow).

Figure 5:
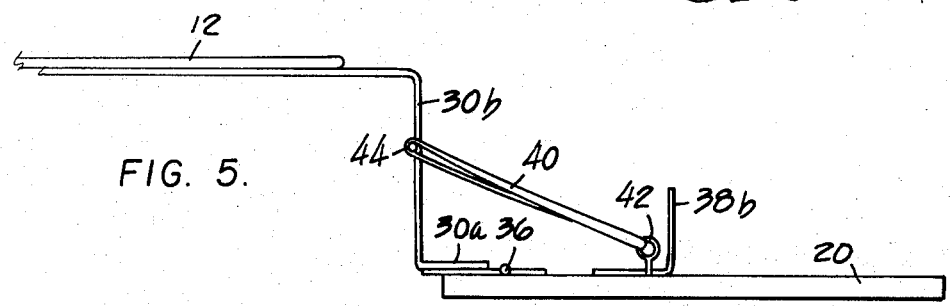
FIG. 5 is a side elevation view of the FIG. 1 cover showing the cover in the closed position.

The connecting piece 30 has a leg portion 30a and a leg portion 30b which are effective to offset the frame 12 both horizontally and vertically with respect to the horizontal pivot axis 36. This offset construction permits the hinge element 28 to swing down flush against the top surface of the support member 20 to provide a stop for holding the cover at the closed position of the cover (see FIG. 5).

Figure 6:
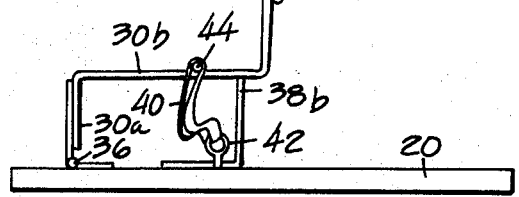
FIG. 6 is a side elevation view like FIG. 5 but showing the cover in the open position.

An angle piece 38 has a horizontally extending arm 38a which is connected to the support member 20 and a vertically extending arm 38b which engages the underside of the part 30b of the connecting piece 30 to hold the cover at the open position illustrated in FIGS 1 and 6.

The cover 10 includes resilient biasing means for pulling the cover to the open position illustrated in FIGS. 1 and 6. In the specific form of the invention shown in FIG. 1 the biasing means comprise a pair of heavy rubber bands 40. One end of each rubber band is connected through an eyelet 42 screwed into the support member 20, and the other end of each rubber band is looped over a related end of a hook 44 which is welded or otherwise connected to the part 30b of the connecting piece 30.

In a preferred form of the present invention, the size of the rubber bands 40 and the points of connection to the support 20 and the connecting piece 30 (i.e., the location of the eyelet 42 and the hook 44) are such that the weight of the frame 12 (when the cover is in the down position) is just great enough to keep the cover in the closed position against the force of the extended rubber bands 40 which tend to pull the cover upward about the pivot 36. However, just a slight upward tap on the bottom of the cover is sufficient to start the cover swinging upward, and the rubber bands 40 then continue to pull the cover upward until it engages against the stop 38b in the open position.

The biasing means can also incorporate springs or other resilient members, and the biasing means can be connected so that the hunter can open the cover merely by releasing a string or rope, if this arrangement is desired, or by releasing a hook between the base member 20 and the strap 28 of the hinge.

Other minor modifications to the specific structural features shown in FIG. 1 described above can also be made without departing from the present invention.

Figure 2:
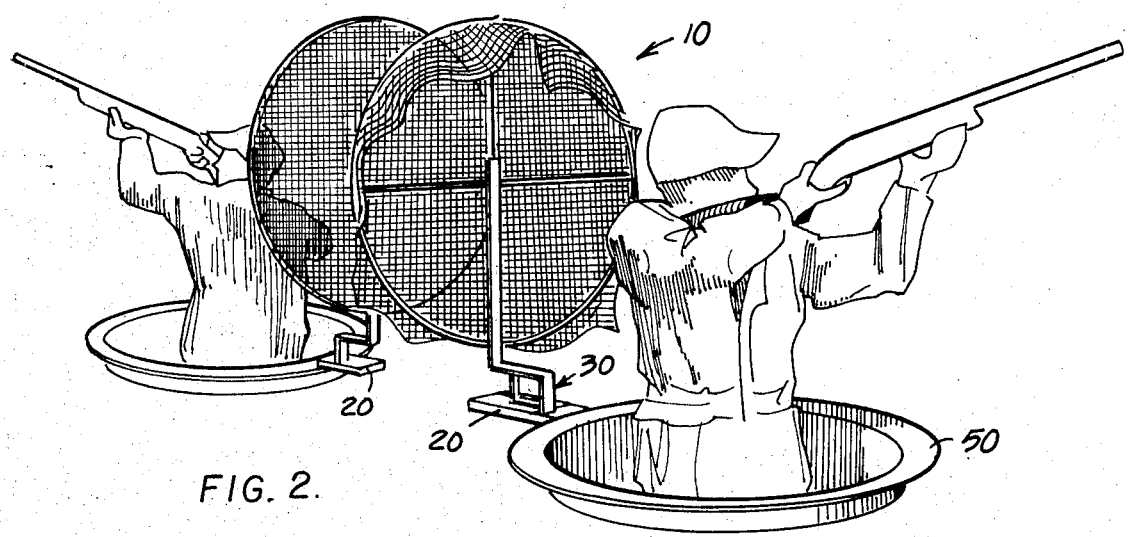
FIG. 2 is an isometric view showing the cover in an opened position and associated with a tank type of duck blind.

FIG. 2 shows how a cover 10 of FIG. 1 is associated with tank types of blinds 50. With this type of blind the support member 20 is attached or formed integrally with the upper flange of the tank blind 50. In some cases it may be desirable to mount the cover on a vertically extending support to raise the cover off the blind and to thereby provide more height inside the blind for taller hunters. Because the cover 10 swings vertically as it is opened, the cover can be attached to the blind at a position which enables the opened cover to act as a shield for a hunter in an adjacent blind. Thus, as illustrated in FIG. 2, each of the covers open toward an adjacent blind so that a hunter in one blind cannot swing his gun around at an angle to which he might accidentally hit the hunter in the adjacent blind.

Figure 3:
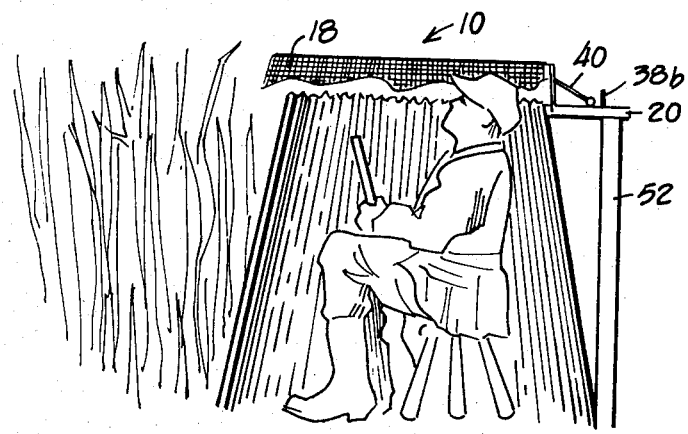
FIG. 3 is a side elevation view showing the cover of FIG. 1 in a closed position on an above-ground blind with the hunter sitting inside the blind.
Figure 4:
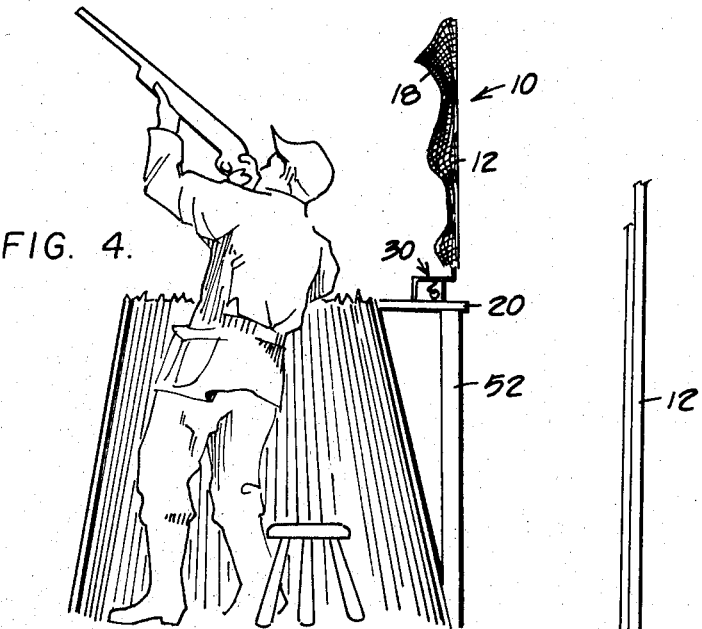
FIG. 4 is a side elevation view like FIG. 3 but showing the cover in an open position and with the hunter standing up within the top opening in a blind in the shooting position.

The cover of the present invention is equally applicable to above ground blinds such as the blind shown in FIGS. 3 and 4. An above ground blind in a tule marsh is often constructed by driving a stake, such as a 2×4 52 into the ground and then placing reeds around in a general circular pattern as illustrated to form a blind. The support member 20, in this type of blind, is attached to the stake 52, and the operation of the cover is as described above.

Thus, the present invention provides a cover which is mounted for pivoting about a hinge having a horizontal axis so that the cover swings in a vertical direction between the closed position and the open position.

The cover is quickly moved to the open position from the closed position by just a light tap on the underside of the cover frame.

The connection between the frame of the cover and the hinge provides for both a horizontal and a vertical offset of the frame with respect to the axis of the hinge so that a stop for the closed position and a stop for the open position can be very readily incorporated in the cover structure.

The cover in the open position serves the very important safety function of preventing a hunter from accidentally swinging his gun to a position where he might hit a hunter in an adjacent blind.

To those skilled in the art to which this invention relates, many changes in construction and widely differing embodiments and applications of the invention will suggest themselves without departing from the spirit and scope of the invention. The disclosures and the description herein are purely illustrative and are not intended to be in any sense limiting.

I claim:

1. A cover for a hunter's blind of the kind used to camouflage the presence of a hunter, said cover comprising, screen means for covering a top opening in the blind, said screen means including a peripheral frame and netting on the frame, said netting being sufficiently open to permit a hunter beneath the netting to watch flying wild fowl through the netting, mounting means including a base member for mounting the screen means adjacent one edge of the top opening in the blind, and hinge means for connecting the screen means to the base member for opening movement and having a generally horizontally extending axis whereby the screen means swings vertically about the hinge means between a generally horizontally extending closed cover position over the blind and a generally vertically extending open position.

2. The invention defined in claim 1 including a stop for holding the screen means in the horizontal position.

3. The invention defined in claim 1 including a stop for holding the screen means in the vertical position.

4. A cover for a hunter's blind of the kind used to camouflage the presence of a hunter, said cover comprising, screen means for covering a top opening in the blind, hinge means for connecting the screen means to the blind for opening movement and having a generally horizontally extending axis whereby the screen means swing vertically about the hinge means between a generally horizontally extending closed cover position on the blind and a generally vertically extending open position, and wherein the screen means includes an outer frame and the hinge means connects an end edge of the frame to the blind.

5. The invention defined in claim 4 wherein the hinge means includes a connecting piece which offsets the edge of the frame both vertically and horizontally from the axis of the hinge means.

6. The invention defined in claim 4 wherein the screen means includes cross pieces extending across the outer frame and netting on the top of the frame and cross pieces.

7. The invention defined in claim 1 wherein the blind is a tank having an open top and the hinge means connects the screen means to a top edge of the opening in the tank.

8. A cover for a hunter's blind of the kind used to camouflage the presence of a hunter, said cover comprising, screen means for covering a top opening in the blind, hinge means for connecting the screen means to the blind for opening movement and having a generally horizontally extending axis whereby the screen means swing vertically about the hinge means between a generally horizontally extending closed cover position on the blind and a generally vertically extending open position, and wherein the blind is an above-ground blind having an open top and at least one vertical post and wherein the hinge means connects the screen means to a top part of the post.

9. The invention defined in claim 1 including biasing means for biasing the screen means toward the vertical position.

10. The invention defined in claim 9 wherein the hinge means includes a connecting piece which has an upper end attached to an edge of the peripheral frame and a lower end forming a part of the hinge means and wherein the connecting piece is shaped to offset said edge of the peripheral frame both horizontally and vertically from the axis of the hinge means and wherein the biasing means is attached to the connecting piece in a manner such that the screen means will remain in the horizontal position until the screen means is swung to a slight upward angle whereupon the biasing means will then continue to swing the screen means to the vertical position.

11. The invention defined in claim 10 wherein the connecting piece is a main support strut of flat strip steel.

12. A cover for a hunter's blind of the kind used to camouflage the presence of a hunter, said cover comprising, screen means for covering a top opening in the blind, hinge means for connecting the screen means to the blind for opening movement and having a generally horizontally extending axis whereby the screen means swing vertically about the hinge means between a generally horizontally extending closed cover position on the blind and a generally vertically extending open position, and including a second cover comprising screen means for covering a top opening in a second blind and second hinge means having a generally horizontally extending axis for swinging the second screen means vertically between a generally horizontally extending closed cover position on the second blind and a generally vertically extending open position and wherein the sizes of the screen means and the alignment of the first and second hinge means are such that a hunter standing up in the opening in one blind cannot swing his gun past the related screen means to an angle at which he could shoot the hunter in the other blind.

13. A cover for a pair of adjacent hunter's blinds of the kind used to camouflage the presence of a hunter, said cover comprising, first and second screens for covering the respective top openings in the adjacent blinds, a mounting base member for the screens and a hinge for each screen, each of said hinges being connected to one edge of a related screen and mounted on the base member, each hinge having a generally horizontally extending pivot axis and wherein the hinges are mounted on the base member in a manner such that each screen swings in a vertical direction to an open position toward the adjacent blind so that the screens offer a physical barrier to prevent a hunter in one blind from swinging his gun to an angle at which the hunter could injure the hunter in the adjacent blind.

* * * * *